United States Patent [19]

Brodzik et al.

[11] Patent Number: 4,677,538
[45] Date of Patent: Jun. 30, 1987

[54] SWEEP TRANSFORMER WITH TERMINATING PC BOARD

[75] Inventors: Paul E. Brodzik, Deerfield; Arthur J. Lostumo, Franklin Park, both of Ill.

[73] Assignee: Zenith Electronics Corporation, Glenview, Ill.

[21] Appl. No.: 881,293

[22] Filed: Jul. 2, 1986

[51] Int. Cl.$^4$ ............................................. H02M 7/06
[52] U.S. Cl. .................................. 363/126; 361/400; 336/200
[58] Field of Search .................... 363/67–68, 363/126, 141; 361/400, 401, 417, 419; 336/182, 184–185, 192, 196, 200, 210

[56] References Cited

U.S. PATENT DOCUMENTS

| | | |
|---|---|---|
| 2,430,990 | 11/1947 | Moore . |
| 2,482,471 | 9/1949 | Dowell, III . |
| 2,503,879 | 4/1950 | Mac Donald . |
| 2,513,161 | 6/1950 | Friend . |
| 4,103,267 | 7/1978 | Olschewski ........................ 336/200 |
| 4,247,889 | 1/1981 | Riechmann ........................ 363/126 |
| 4,249,229 | 2/1981 | Hester ................................ 336/200 |
| 4,292,665 | 9/1981 | Hersom et al. ................... 363/141 |
| 4,293,903 | 10/1981 | Mochida et al. .................... 363/68 |
| 4,342,976 | 8/1982 | Ryser ................................. 336/200 |
| 4,509,109 | 4/1985 | Hansen .............................. 336/200 |
| 4,527,229 | 7/1985 | Imamura et al. .................. 363/126 |

*Primary Examiner*—Peter S. Wong

[57] ABSTRACT

A sweep transformer such as used in a raster scanned video display includes first inner and second outer cylindrical bobbins, with the outer bobbin having a plurality of secondary windings disposed along the length thereof and a plurality of paired terminal pins each coupled to respective ends of each of the windings and arranged in two parallel linear arrays along the length of the bobbin. The terminal pins are adapted for insertion in a plurality of apertures arranged in a pair of spaced, parallel, linear arrays in a printed circuit (PC) board for coupling to conductors and electronic components on the PC board by soldering. The bobbin further includes a pair of snap-acting latches disposed in a spaced arrangement along the length thereof which are each adapted for insertion within a respective aperture in the PC board for securely mounting the transformer thereon. The transformer may be assembled and mounted on the PC board by automatic handling means.

11 Claims, 4 Drawing Figures

SWEEP TRANSFORMER WITH TERMINATING PC BOARD

BACKGROUND OF THE INVENTION

This invention relates generally to transformers and is particularly directed to an arrangement for mounting a multi-winding transformer on a printed circuit (PC) board and coupling various circuit components to the transformer.

In a conventional raster scanned video display incorporating a cathode ray tube (CRT) such as a television receiver or a computer terminal, a rectified and regulated AC line voltage is provided to a primary winding of a high voltage sweep transformer. The sweep transformer includes a primary winding as well as a plurality of secondary windings such as pulse and high voltage secondary windings which are electromagnetically coupled to the primary winding for developing various output voltages for operation of the video display device. For example, a high voltage is provided to the CRT's anode for accelerating the electrons emitted by its cathode, while the pulse windings provide various output pulses required for such functions as phase control of CRT raster scan with the video signal and ensuring a horizontal distortion-free video image. These output pulses may also be rectified to provide various DC voltages required for the operation of other circuits. For example, in a computer terminal several DC voltage levels may be required for such functions as powering logic circuitry, driving computer peripherals, etc. Rectifying diodes are typically coupled across the secondary windings of the sweep transformer for generating these various DC outputs. The DC output voltages are then provided to various terminal pins typically positioned on one end of the bobbin, which pins are adapted for coupling to DC driven output circuits.

Referring to FIG. 1, there is shown a partially cutaway lateral view of a prior art transformer 10. The transformer 10 includes a second outer bobbin 14 coaxially disposed about a first inner bobbin 12. The first inner bobbin 12 includes a plurality of flanges or ribs 22 between which are disposed a primary winding 26. The second outer bobbin 14 similarly includes a plurality of laterally extending ribs between which are disposed in a wound configuration various secondary windings 30. The various secondary windings 30 are coupled to a plurality of terminal pins 34 which are positioned on one end of the second outer bobbin 14. An end portion 24 of one of the secondary windings is shown coupled to one of the terminal pins 34 by conventional means such as soldering. A ferrite core 16 comprised of two U-shaped core sections 18, 20 is adapted for insertion within the first inner bobbin 12 and along the length of the second outer bobbin 14. Although only one is shown in the figure, a plurality of diodes 32 are coupled across respective ends of each of the secondary windings 30 to provide a rectified output from a secondary winding to the terminal pins 34. Terminal pins 34 are typically inserted in apertures on a PC board and are thus coupled in circuit with various components positioned thereon, although this is not shown in the figure for simplicity.

These diodes are typically coupled across respective pairs of connector or terminal pins 36 extending outward from a lateral portion of the second, outer transformer bobbin, with the number of diodes determined by the number of secondary windings positioned on the bobbin. These diodes are generally coupled to the terminal pins by hand soldering in a labor intensive, time consuming and expensive process. In addition, this procedure for transformer assembly is subject to various errors such as coupling a diode of the wrong rating to respective ends of a secondary winding, reversing the direction of the diode in circuit, or coupling a diode to respective ends of two different secondary windings. Moreover, the manual nature of this assembly procedure reduces the reliability of the electrical connection because of the human factor.

The present invention overcomes the aforementioned limitations of the prior art by providing a sweep transformer with a terminating PC board which is low cost and simple in construction and is particularly adapted for automatic assembly and mounting in circuit on a PC board.

OBJECTS OF THE INVENTION

Accordingly, it is an object of the present invention to provide an improved sweep transformer for use in a raster scanned video display.

It is another object of the present invention to provide an improved mounting and electrical coupling arrangement for a multi-winding transformer.

Yet another object of the present invention is to reduce the cost and complexity of the assembly and PC board mounting of a multi-winding transformer.

A further object of the present invention is to provide a more reliable arrangement and procedure for fabricating a multi-pin transformer and connecting it in circuit on a PC board.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
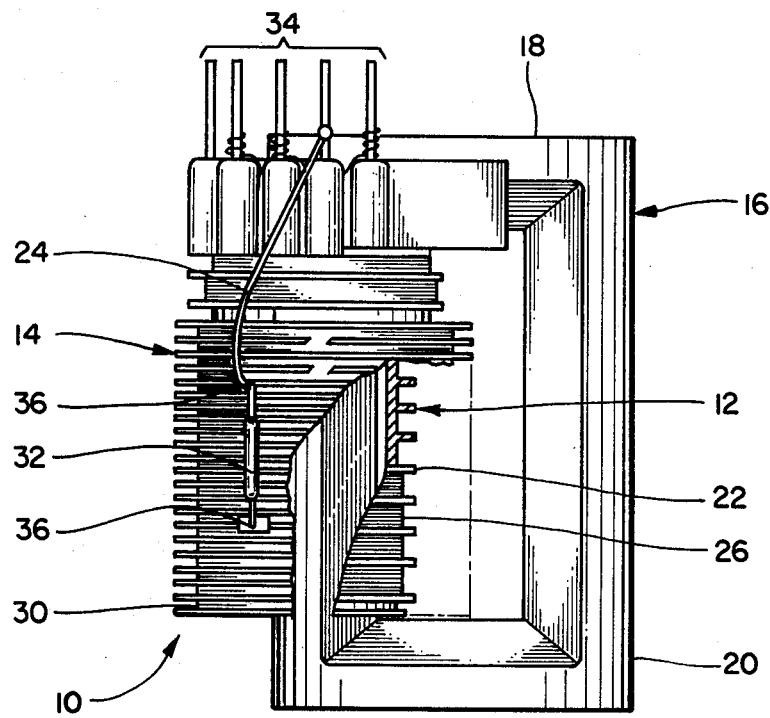
FIG. 1 is a partially cutaway lateral view of a prior art sweep transformer.
Figure 2:
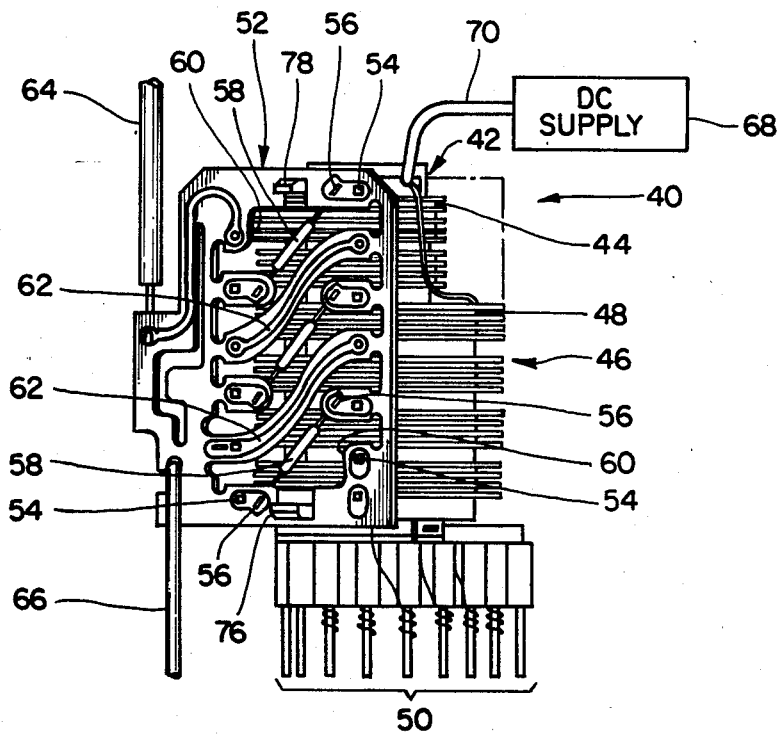
FIG. 2 is a lateral view of a sweep transformer and a PC board combination in accordance with the present invention.
Figure 3:
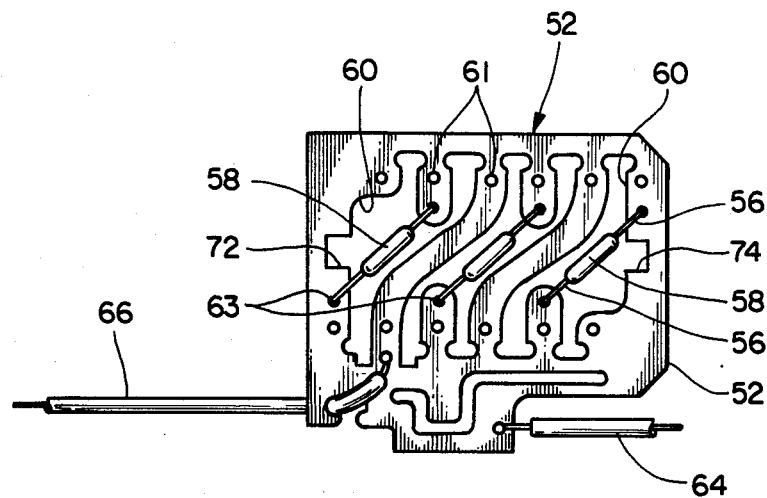
FIG. 3 is a top plan view of a PC board for use in the sweep transformer-PC board combination of FIG. 2.
Figure 4:
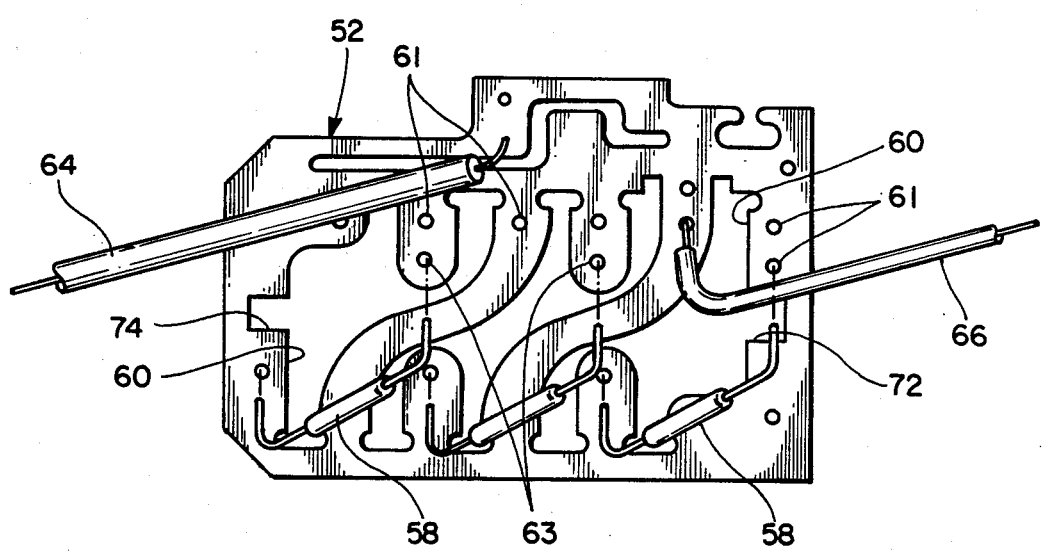
FIG. 4 is an exploded perspective view of the combination of electronic components and electrical leads positioned on the PC board of FIG. 3.

Referring to FIG. 2, there is shown a lateral view of a transformer with terminating PC board 40 in accordance with the present invention. FIGS. 3 and 4 respectively illustrate upper and lower portions of a PC board 52 in combination with electronic components and leads positioned thereon for use in the transformer 40 of FIG. 2.

The transformer with terminating PC board 40 includes a first inner bobbin 42 around which is disposed a primary winding 44. The primary winding 44 is coupled by means of a power supply lead 70 to a DC supply 68. Coaxially disposed about and along the length of the first inner bobbin 42 is a second outer bobbin 46. The second outer bobbin 46 has one or more secondary windings 48 disposed about its outer circumference and along the length thereof. Each of the secondary windings 48 is electromagnetically coupled to the primary winding 44 such that current within the primary winding induces corresponding currents within the various secondary windings 48. Positioned on and extending from one end of the second outer bobbin 46 are a first plurality of terminal pins 50 which are coupled to various of the secondary windings 48. The terminal pins 50 are adapted for insertion within apertures on a PC board (not shown) and for coupling to circuitry thereon. The primary winding 44 may also be connected to one or more of the terminal pins 50 for coupling to the DC supply 68, although this is not the arrangement illustrated in FIG. 2. The transformer 40 also includes a ferrite core which is not shown in FIG. 2 for simplicity.

Coupled to and extending from a lateral portion of the second outer bobbin 46 are a first plurality of terminal pins 54. Each of the second plurality of terminal pins 54 is adapted for insertion within a respective first aperture 61 within the PC board 52. A plurality of the generally circular first apertures 61 are arranged in two generally parallel, spaced arrays. Each of the second plurality of terminal pins 54 is further coupled to one end of a respective secondary winding 48. A plurality of second generally circular apertures 63 are also arranged in a pair of parallel, spaced linear arrays. Each of the second apertures 63 is adapted for receiving a respective terminal of a diode 58. Each of the diodes 58 is positioned between and coupled to two of the second apertures 63 and extends across one of a third plurality of irregular apertures 60 within the PC board 52. Thus, with a terminal pin 54 coupled to one end of a secondary winding 48 and positioned within one of the first apertures 61 and a diode lead positioned within an adjacent second aperture 63, respective pairs of transformer terminal pins and diode leads may be electrically coupled by conventional means such as soldering as shown in FIG. 2. In this manner, each of the diodes 58 may be coupled across respective ends of a secondary winding 48 for providing a DC output from the transformer. Thus, first and second DC output leads 64, 66 may be connected to a respective conductor on the PC board 52 and thus coupled in circuit with the diodes 58 thereon. Therefore, various DC voltages may be derived from the transformer 40 with terminating PC board.

Provided for in the PC board 52 are first and second slots 72, 74 positioned within respective first irregular apertures 60 adjacent to opposed ends of the PC board. As shown in the figures, the first slot 72 is wider than the second slot 74. Positioned on a lateral portion of the second outer bobbin 14 in an aligned, spaced arrangement are first and second resilient latches 76, 78. The first latch 76 is adapted for insertion within the first slot 72, while the second latch 78 is adapted for insertion in the second slot 74. Each of the first and second latches 76, 78 is of a resilient nature and is biased inwardly toward the other latch when inserted within a respective slot in the PC board 52. When each of the latches is fully inserted within a respective slot, the resiliency of each of the latches causes the latch to be displaced outwardly toward an adjacent edge of the PC board 52 and to engage an edge of the board immediately adjacent to the respective slot in which the latch is inserted. In this manner, the second outer bobbin 46 may be securely mounted to the PC board 52. The second outer bobbin 46 may be removed from the PC board 52 by engaging each of the first and second resilient latches 76, 78 and displacing them inward toward each other so as to disengage an immediately adjacent, inner edge of the PC board to permit each of the latches to be removed from a respective slot. By size-coding the first and second slots 72, 74 and the first and second latches 76, 78, the second outer bobbin 46 may be positioned upon the PC board 52 in only one orientation to prevent improper positioning of the bobbin assembly on the PC board during transformer assembly.

The sweep transformer with terminating PC board of the present invention is particularly adapted for automatic assembly. For example, the aligned, spaced arrays of terminal pins 54 on the transformer's second outer bobbin 46 are readily adapted for insertion within respective first apertures 61 on the PC board 52 by automatic handling apparatus. Similarly, insertion of diode leads within the second apertures 63 as well as insertion of the various conductors in other apertures in the PC board 52 is easily accomplished by robotic assembly equipment. The soldering and coupling of electrical leads similarly is easily accomplished by automatic circuit board assembly equipment.

There has thus been shown a sweep transformer with terminating PC board which is highly adapted for automatic assembly by high speed robotics. The sweep transformer includes a first inner bobbin with a primary winding and a second outer bobbin on which are disposed a plurality of secondary windings and from a lateral portion of which extend a plurality of terminal pins which are each coupled to a respective end of one of the secondary windings. The terminal pins are adapted for insertion within apertures in a PC board and for coupling to diodes also positioned on the PC board. Various DC output voltages can be derived from the aforementioned diode connections which may be made by high speed, automatic assembly equipment. The second outer bobbin of the transformer includes resilient latch means for secure mounting on and engagement with the PC board.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A transformer coupled to an input DC voltage source for providing an output DC voltage, said transformer comprising:
   a first inner bobbin having a primary winding disposed thereon, said primary winding coupled to the input DC voltage source;
   a second outer bobbin coaxially disposed about said first inner bobbin and having a secondary winding disposed thereon, wherein said secondary winding is electromagnetically coupled to said primary winding;
a printed circuit board;
mounting means positioned on said second outer bobbin for securely mounting said transformer on said circuit board; and
unidirectional conducting means positioned on said circuit board and coupled in circuit with said secondary winding for providing a DC output voltage.

2. The transformer of claim 1 wherein said unidirectional conducting means is a diode.

3. The transformer of claim 1 further comprising first and second coupling means for connecting respective ends of said secondary winding to said unidirectional conducting means.

4. The transformer of claim 3 wherein each of said first and second coupling means is a terminal pin.

5. The transformer of claim 4 wherein said terminal pins are mounted to and extend from a lateral portion of said second outer bobbin and are further coupled to said printed circuit board.

6. The transformer of claim 1 wherein said mounting means includes a plurality of latches positioned on a lateral portion of said second outer bobbin for engaging said circuit board.

7. The transformer of claim 6 wherein said circuit board includes a plurality of spaced apertures for receiving a respective latch on said second outer bobbin in maintaining said transformer securely in position on said circuit board.

8. The transformer of claim 7 wherein each latch is uniquely coded with respect to its associated aperture to ensure that the transformer is positioned on said circuit board in a selected orientation.

9. The transformer of claim 8 wherein each latch and associated aperture combination is uniquely size-coded.

10. The transformer of claim 7 wherein each of said latches includes a resilient member for permitting the transformer to be mounted upon and removed from said circuit board in a snap-acting manner.

11. The transformer of claim 1 wherein the transformer further comprises a plurality of secondary windings positioned on said second outer bobbin and a plurality of unidirectional conducting means positioned on said circuit board and coupled in circuit with a respective secondary winding.

* * * * *